(12) United States Patent
Eylon et al.

(10) Patent No.: US 9,055,123 B2
(45) Date of Patent: *Jun. 9, 2015

(54) ENHANCED REBOOT COMMAND

(71) Applicant: Red Hat Israel, Ltd., Raanana (IL)

(72) Inventors: Yaniv Eylon, Kibbutz Hasolelim (IL); Moran Goldboim, Kibbutz Hanaton (IL)

(73) Assignee: Red Hat Israel, Ltd., Raanana (IL)

( * ) Notice: Subject to any disclaimer, the term of this patent is extended or adjusted under 35 U.S.C. 154(b) by 0 days.

This patent is subject to a terminal disclaimer.

(21) Appl. No.: 14/073,824

(22) Filed: Nov. 6, 2013

(65) Prior Publication Data
US 2014/0068037 A1    Mar. 6, 2014

Related U.S. Application Data

(63) Continuation of application No. 12/916,980, filed on Nov. 1, 2010, now Pat. No. 8,589,525.

(51) Int. Cl.
*H04L 29/08* (2006.01)
*H04L 29/06* (2006.01)
*G06F 9/44* (2006.01)

(52) U.S. Cl.
CPC ............... *H04L 67/34* (2013.01); *H04L 67/38* (2013.01); *G06F 9/4401* (2013.01); *G06F 9/4406* (2013.01); *G06F 9/4416* (2013.01)

(58) Field of Classification Search
CPC ................................ H04L 67/34; H04L 67/38

USPC ............................ 709/222; 719/119, 123, 126
See application file for complete search history.

(56) References Cited

U.S. PATENT DOCUMENTS

| 6,601,166 | B1 | 7/2003 | Ayyar et al. |
| 8,260,893 | B1 | 9/2012 | Bandhole et al. |
| 8,589,525 | B2 * | 11/2013 | Eylon et al. ................. 709/222 |

OTHER PUBLICATIONS

USPTO Office Action for U.S. Appl. No. 12/916,980, mailed Sep. 25, 2012.
USPTO Office Action for U.S. Appl. No. 12/916,980, mailed Feb. 20, 2013.
USPTO Notice of Allowance for U.S. Appl. No. 12/916,980, mailed Jun. 28, 2013.
APC by Schneider Electric, "How do you make a Netwrok Mgmt Card communicate on a network?" Pub. Nov. 14, 2003, http://nam-en.apc.com/app/answers/details/a_id/3061, printed on Nov. 1, 2010, pp. 1-5.

* cited by examiner

*Primary Examiner* — Yves Dalencourt
(74) *Attorney, Agent, or Firm* — Lowenstein Sandler LLP

(57) ABSTRACT

A method and system allows a computer system to perform a network reboot in response to an enhanced reboot command. The computer system receives a command to load an operating system and interprets the command to determine whether a physical machine or a virtual machine is to be rebooted. In response to a determination that the command indicates the use of a network option, the computer system loads the operating system from a networked server, and perform rebooting according to the interpreted command with the use of the operating system.

18 Claims, 4 Drawing Sheets

ID

ENHANCED REBOOT COMMAND

RELATED APPLICATION

This application is a continuation of U.S. patent application Ser. No. 12/916,980, filed on Nov. 1, 2010, the entirety of which is incorporated herein by reference.

TECHNICAL FIELD

Embodiments of the present invention relate to a computer system, and more specifically, to network rebooting a computer system

BACKGROUND

Network booting (or "network rebooting") refers to the booting (or rebooting) of a computer over a network, using the operating system (OS) stored on the storage of a server. An initial set of software is loaded from a server over a network. The server from which to load the initial software and the OS is usually found by broadcasting or multicasting a request. This initial software contains enough data to take control of the rebooting process and to load the OS over the network.

In most current computer systems, if a user wants to command a computer to perform a network reboot, he needs to wait for the Basic Input/Output System (BIOS) initialization to start and then enter a special command (e.g., F12) during the rebooting process. The special command directs the computer to reboot from the network. The need of human interaction makes it difficult to automate the network rebooting process.

BRIEF DESCRIPTION OF THE DRAWINGS

The present invention is illustrated by way of example, and not by way of limitation, and can be more fully understood with reference to the following detailed description when considered in connection with the figures in which.

DETAILED DESCRIPTION

Described herein is a method and system for performing a network reboot in response to an enhanced reboot command. In one embodiment, a computer system receives a command to load an operating system and interprets the reboot command to determine whether a physical machine or a virtual machine is to be rebooted. In response to a determination that the command indicates the use of a network option, the computer system loads the operating system from a networked server, and perform rebooting according to the interpreted command with the use of the operating system.

According to one embodiment of the invention, a user (e.g., a system administrator) may send a reboot command that includes a flag (e.g., a "-net" flag) in the same command line to indicate the use of a network option. Upon receiving the reboot command, the computer system may attempt to perform a network boot (that is, booting from a networked server) instead of trying to boot from a local disk. If no network is available to the computer system, the computer system may try to boot from a local disk. The reboot command described herein provides great simplicity and flexibility in allowing a user to determine, at each reboot time, whether to perform a network boot. A network reboot can be performed at the discretion of the user without the user sending another command (e.g., F12) during the reboot process. The user also does not need to modify a stored reboot priority list each time he wishes to force a network reboot. When the reboot command indicates the use of the network option, the computer system can perform a network reboot without first checking the stored reboot priority list.

In the descriptions herein, the terms "booting" and "rebooting" may be used interchangeably to describe a process for loading an operating system and starting a computer system. The computer system herein may be a physical computer, or a virtual machine that runs on a host computer.

Embodiments of the present invention allow a user to command a computer to network reboot in a single command, without the need for the user to enter another command during the rebooting process.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Figure 1:
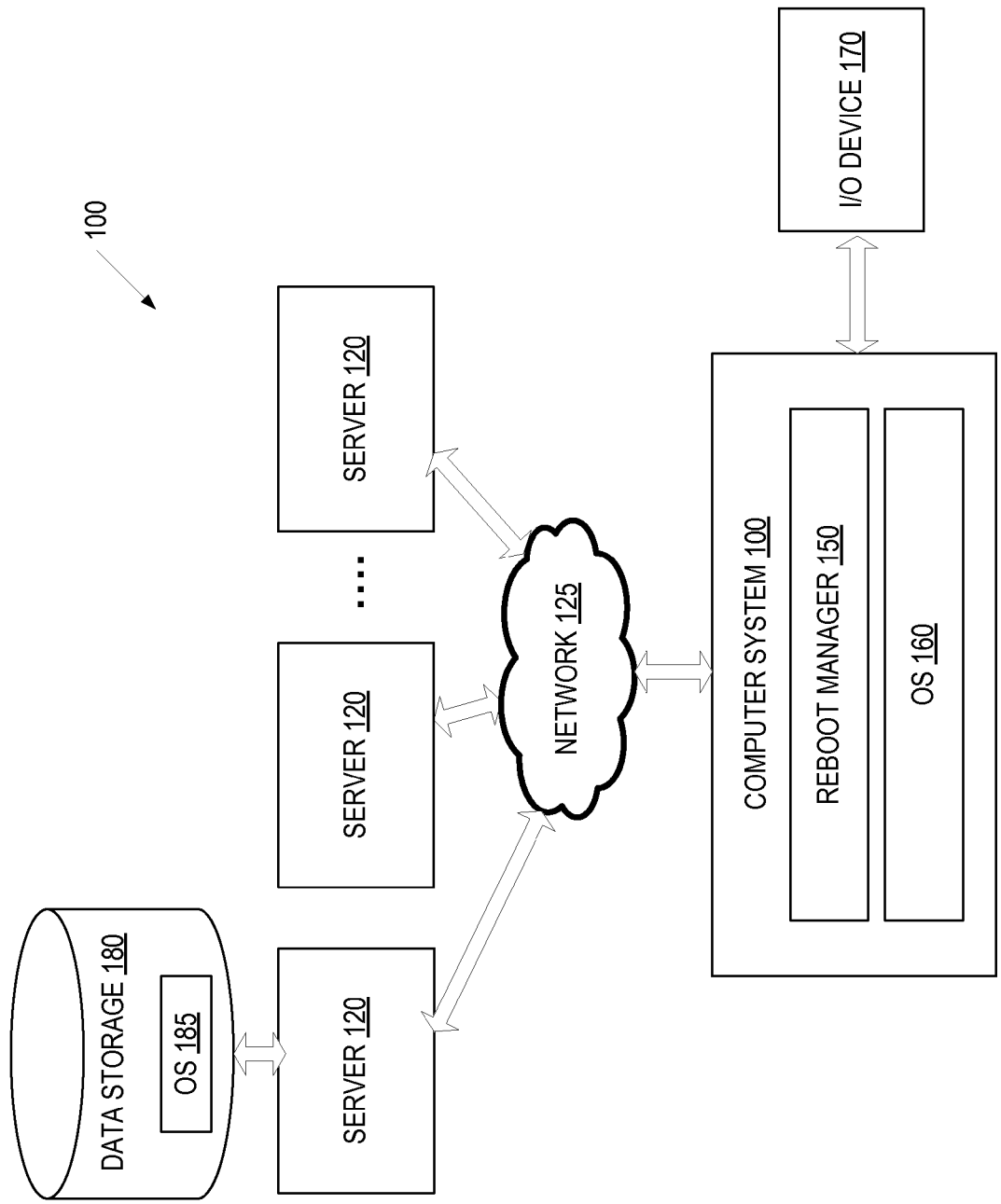
FIG. 1 is a block diagram of a network architecture in which some embodiments of the invention may be implemented.

FIG. 1 is a block diagram that illustrates an embodiment of a computer system 100 that is coupled to one or more servers 120 via a network 125. The network 125 may be a private network (e.g., a local area network (LAN), a wide area network (WAN), intranet, etc.) or a public network (e.g., the Internet). Each of the computer system 100 and the servers 120 may be a computer (e.g., a server, a workstation, a personal computer (PC), a laptop, etc.), a mobile phone, a handheld computing device, a game station, a personal digital assistant (PDA), etc.

In one embodiment, the computer system 100 may be coupled to an I/O device 170 (e.g., a keyboard, a display screen, etc.), through which to receive commands from a user (e.g., a system administrator).

In one embodiment, at least one of the servers 120 is coupled to a data storage 180, which may include mass storage devices, such as magnetic or optical storage based disks, tapes or hard drives. The data storage 180 may store an operating system (OS) 185. In one embodiment, the computer system 100 can load a copy of the OS 185 over the network 125 and stores the copy locally as an OS 160.

According to one embodiment of the present invention, the computer system 100 comprises a reboot manager 150 to manage the rebooting process of the computer system 100. Rebooting refers to the operations of reloading the software (including the OS) that runs on a computer. The reboot manager 150 responds to a reboot command from a user to load an OS and to restart the computer system 100. In one embodiment, the reboot command includes a flag (e.g., "-net") in a single command. The flag indicates a network option is to be used to load an OS from one of the servers 120.

In one embodiment, the reboot manager 150 may additionally or alternatively manage the rebooting process of one or more virtual machines that are hosted by the computer system 100. Each virtual machine runs a guest operating system (OS). The virtual machines may have the same or different guest operating systems, such as Microsoft Windows®, Linux®, Solaris®, Mac® OS, etc. The computer system 100 may run a hypervisor to emulate underlying host hardware, making the use of the virtual machine transparent to the guest OS and the user of the computer system 100. The hypervisor may also be known as a virtual machine monitor (VMM) or a kernel-based hypervisor. In some embodiments, the hypervisor may be part of the host OS. In one embodiment, the reboot manager 150 responds to a reboot command (e.g., a reboot command that includes the "-net" flag) to reboot one of the virtual machines using the OS loaded from one of the networked servers 120.

Figure 2:
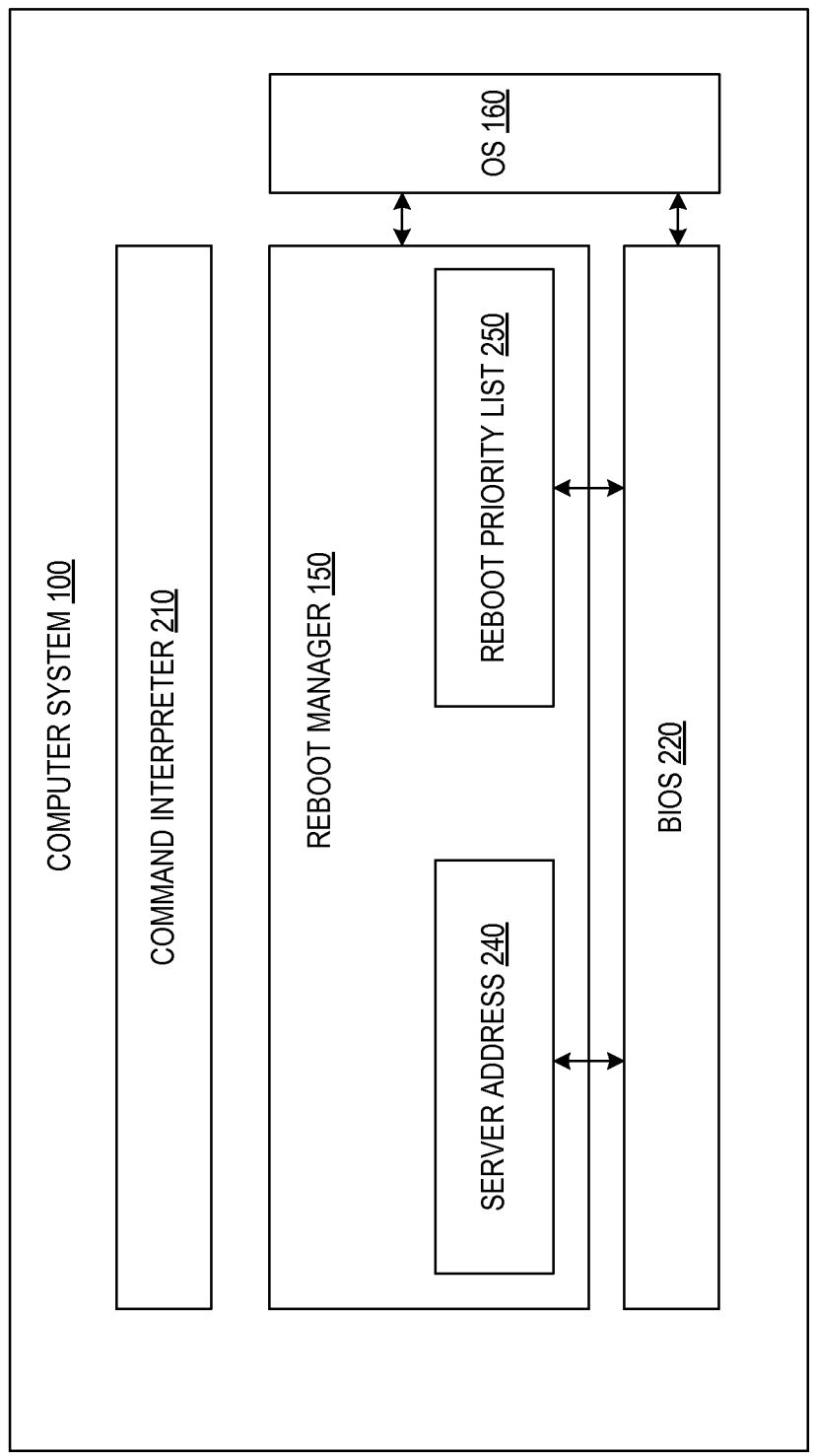
FIG. 2 is a block diagram of one embodiment of a computer system capable of performing a network reboot.

FIG. 2 is a block diagram that illustrates an embodiment of the computer system 100 in more detail. In this embodiment, the computer system 100 uses a command interpreter 210 to interpret the commands received by the computer system 100; e.g., through the I/O device 170 of FIG. 1. In one embodiment, when a reboot command is received, the command interpreter 210 may determine whether the command includes a flag that indicates the use of the network option. The command interpreter 210 then passes the interpreted command to the reboot manager 150. If the network option is to be used, the reboot manager 150 looks up a server address 240 in memory. In one embodiment, the server address 240 is the Internet Protocol (IP) address of the server 120 from which an OS is to be loaded. The IP address may be stored and configured by a system administrator. In another embodiment, the IP address is found by the computer system 100 sending a multicasting or broadcasting request to all of the servers 120.

In one embodiment, if the network option is not to be used, the reboot manager 150 looks up the reboot priority list 250 to determine from which location an OS is to be loaded. The reboot priority list 250 may be stored and configured by a system administrator when the computer system is in operation. In an alternative embodiment, the reboot manager 150 may use a default location (e.g., a local hard drive) to load the OS without looking up the reboot priority list 250. The computer system 100 also uses a Basic Input/Output System (BIOS) 220 to store bootstrapping software in a non-volatile memory (e.g., read-only memory (ROM)). The BIOS 220 loads the OS from the location indicated by the reboot manager 150. The computer system 100 then restarts using the newly-loaded OS.

In one embodiment, a user can set a boot order in the reboot priority list 250. For example, the user may enter the command "reboot -bootp net, cd, hda, hdb" to set the boot order to be: network, CD-ROM, Hard Disk (HD) -a, HD -b. In response to the command, the reboot manager 150 updates the reboot priority list 250 accordingly.

Figure 3:
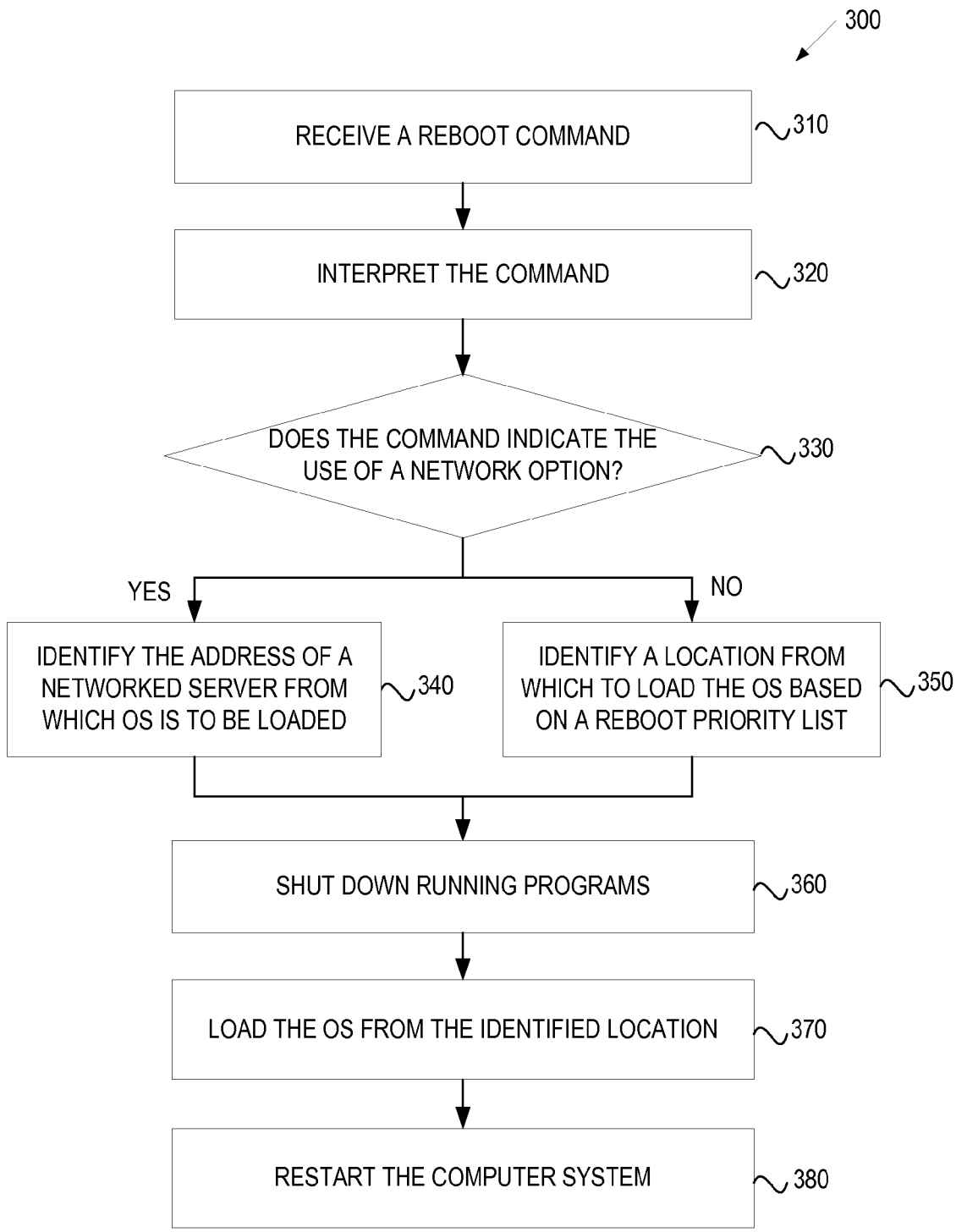
FIG. 3 is a flow diagram of one embodiment of a method for rebooting a computer system.

FIG. 3 is a flow diagram illustrating one embodiment of a method 300 for rebooting a computer system using a network option. The method 300 may be performed by a computer system 400 of FIG. 4 that may comprise hardware (e.g., circuitry, dedicated logic, programmable logic, microcode, etc.), software (e.g., instructions run on a processing device), or a combination thereof. In one embodiment, the method 300 is performed by the computer system 100 of FIG. 1 and FIG. 2.

Referring to FIG. 3, in one embodiment, the method 300 begins when the computer system 100 receives a reboot command from a user (block 310). If the computer system 100 hosts one or more virtual machines, the reboot command may specify one of the virtual machines, or the physical computer system 100, as the "machine" to be rebooted. The computer system 100 interprets the command (block 320), and determines, without any user interaction, whether a physical machine or a virtual machine is to be rebooted, and whether the command indicates that a network option is to be used (block 330) (e.g., by checking whether the reboot command includes a "-net" flag). If the network option is to be used, the computer system 100 identifies, without any user interaction, the address of a networked server from which the OS is to be loaded (block 340). If the network option is not to be used, the computer system 100 identifies, without any user interaction, a location from which to load the OS based on the reboot priority list 250 (FIG. 2) (block 350) or a default location. The computer system 100 then shuts down all running programs on the physical machine or the virtual machine to be rebooted (block 360). The computer system 100 passes control to the BIOS 220, which uses a bootloader to load an OS from the identified location (block 370). The computer system 100 then performs rebooting of the physical machine or the command-specified virtual machine using the newly-loaded OS (block 380).

In one embodiment, the reboot command may include the "-net" option when no network is available to the computer system 100. In this scenario, the computer system 100 may first attempt to load the OS from a network location. When the computer system 100 detects that a network does not exist, the computer system 100 will load an OS according to the reboot priority list 250 or a default location.

Figure 4:
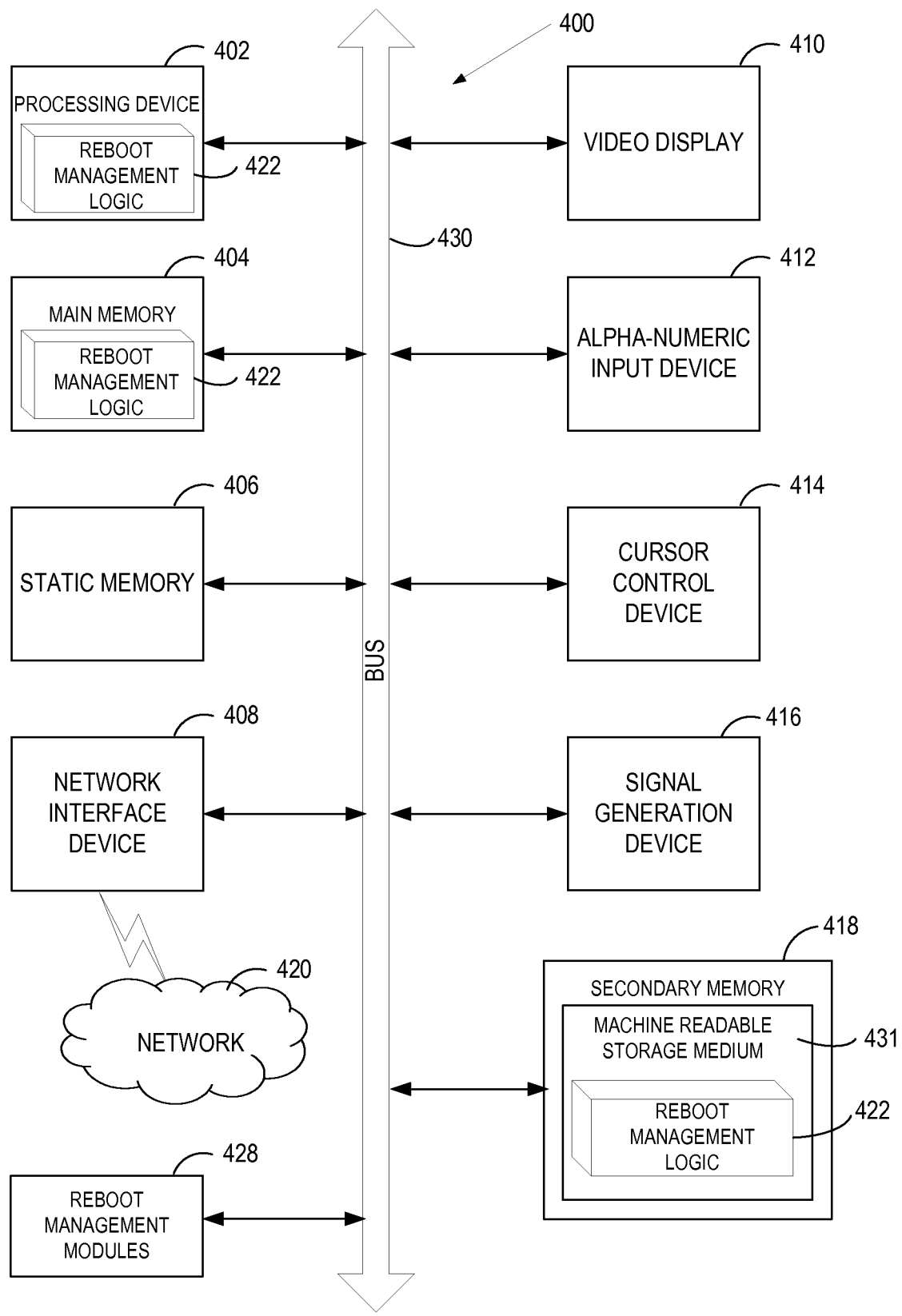
FIG. 4 illustrates a diagrammatic representation of a machine in the exemplary form of a computer system.

FIG. 4 illustrates a diagrammatic representation of a machine in the exemplary form of a computer system 400 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 400 includes a processing device 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a secondary memory 418 (e.g., a data storage device), which communicate with each other via a bus 430.

The processing device 402 represents one or more general-purpose processing devices such as a microprocessor, central processing unit, or the like. More particularly, the processing device 402 may be a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device 402 may also be one or more special-purpose processing devices such as an application specific integrated circuit (ASIC), a field programmable gate array (FPGA), a digital signal processor (DSP), network processor, or the like. The processing device 402 is configured to execute reboot management logic 422 for performing the operations and steps discussed herein.

The computer system 400 may further include a network interface device 408. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The secondary memory 418 may include a machine-readable storage medium (or more specifically a computer-readable storage medium) 431 on which is stored one or more sets of instructions (e.g., reboot management logic 422) embodying any one or more of the methodologies or functions described herein (e.g., the reboot manager 150 of FIGS. 1 and 2). The reboot management logic 422 may also reside, completely or at least partially, within the main memory 404 and/or within the processing device 402 during execution thereof by the computer system 400; the main memory 404 and the processing device 402 also constituting machine-readable storage media. The reboot management logic 422 may further be transmitted or received over a network 420 via the network interface device 408.

The machine-readable storage medium 431 may also be used to store the reboot management logic 422 persistently. While the machine-readable storage medium 431 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine that causes the machine to perform any one or more of the methodologies of the present invention. The term "machine-readable storage medium" shall accordingly be taken to include, but not be limited to, solid-state memories, and optical and magnetic media.

The computer system 400 may additionally include reboot management modules 428 for implementing the functionalities of the reboot manager 150 of FIGS. 1 and 2. The module 428, components and other features described herein (for example in relation to FIG. 1) can be implemented as discrete hardware components or integrated in the functionality of hardware components such as ASICS, FPGAs, DSPs or similar devices. In addition, the module 428 can be implemented as firmware or functional circuitry within hardware devices. Further, the module 428 can be implemented in any combination of hardware devices and software components.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving", "interpreting", "loading", "causing", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general purpose computer system selectively programmed by a computer program stored in the computer system. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method comprising:
    receiving, by a processing device, a command to load an operating system, wherein the operating system to be loaded is a host operating system for a physical machine or a guest operating system for a virtual machine;
    determining whether the command includes a flag set to a network option;
    in response to a determination that the command includes the flag set to the network option, loading the operating system as the host operating system or the guest operating system from a networked server to the processing device;
    in response to a determination that the command does not include the flag set to the network option, loading the operating system from a location other than the networked server to the processing device; and causing rebooting to be performed according to the command with the use of the operating system.

2. The method of claim 1, wherein loading the operating system from a location other than the networked server to the processing device comprises:

determining the location based on a reboot priority list accessible by the processing device.

3. The method of claim 1, wherein loading the operating system comprises:

identifying a network address of the networked server.

4. The method of claim 1, further comprising:

receiving, by the processing device, a reboot command that includes a reboot priority list; and storing the reboot priority list in a storage location accessible by the processing device.

5. The method of claim 1, wherein the operating system is loaded from the networked server without the processing device checking a reboot priority list.

6. The method of claim 1, wherein the operating system is loaded from the networked server without a user sending another command during a reboot process.

7. A system comprising:

an I/O device to receive a command to load an operating system, wherein the operating system to be loaded is a host operating system for a physical machine or a guest operating system for a virtual machine; and a processing device, coupled to the I/O device, to:

determine whether the command includes a flag set to a network option;

in response to a determination that the command includes the flag set to the network option, load the operating system as the host operating system or the guest operating system from a networked server;

in response to a determination that the command does not include the flag set to the network option, load the operating system from a location other than the networked server; and cause rebooting to be performed according to the command with the use of the operating system.

8. The system of claim 7, wherein the processing device is to load the operating system from a location other than the networked server by:

determining the location based on a reboot priority list.

9. The system of claim 7, wherein the processing device is further to identify a network address of the networked server.

10. The system of claim 7, wherein the processing device is further to:

receive a reboot command that includes a reboot priority list; and store the reboot priority list in a storage location accessible by the processing device.

11. The system of claim 7, wherein the processing device is to load the operating system from the networked server without checking a reboot priority list.

12. The system of claim 7, wherein the processing device is to load the operating system from the networked server without a user sending another command during a reboot process.

13. A non-transitory computer readable storage medium including instructions that, when executed by a processing device, cause the processing device to perform a method comprising:

receiving, by the processing device, a command to load an operating system, wherein the operating system to be loaded is a host operating system for a physical machine or a guest operating system for a virtual machine;

determining whether the command includes a flag set to a network option;

in response to a determination that the command includes the flag set to the network option, loading the operating system as the host operating system or the guest operating system from a networked server;

in response to a determination that the command does not include the flag set to the network option, loading the operating system from a location other than the networked server; and causing rebooting to be performed according to the command with the use of the operating system.

14. The computer readable storage medium of claim 13, wherein loading the operating system from a location other than the networked server to the processing device comprises:

determining the location based on a reboot priority list accessible by the processing system.

15. The computer readable storage medium of claim 13, wherein loading the operating system comprises:

identifying a network address of the networked server.

16. The computer readable storage medium of claim 13, wherein the method further comprises:

receiving a reboot command that includes a reboot priority list; and storing the reboot priority list in a storage location accessible by the processing device.

17. The computer readable storage medium of claim 13, wherein the operating system is loaded from the networked server without checking a reboot priority list.

18. The computer readable storage medium of claim 13, wherein the operating system is loaded from the networked server without a user sending another command during a reboot process.

* * * * *